Figure 1:
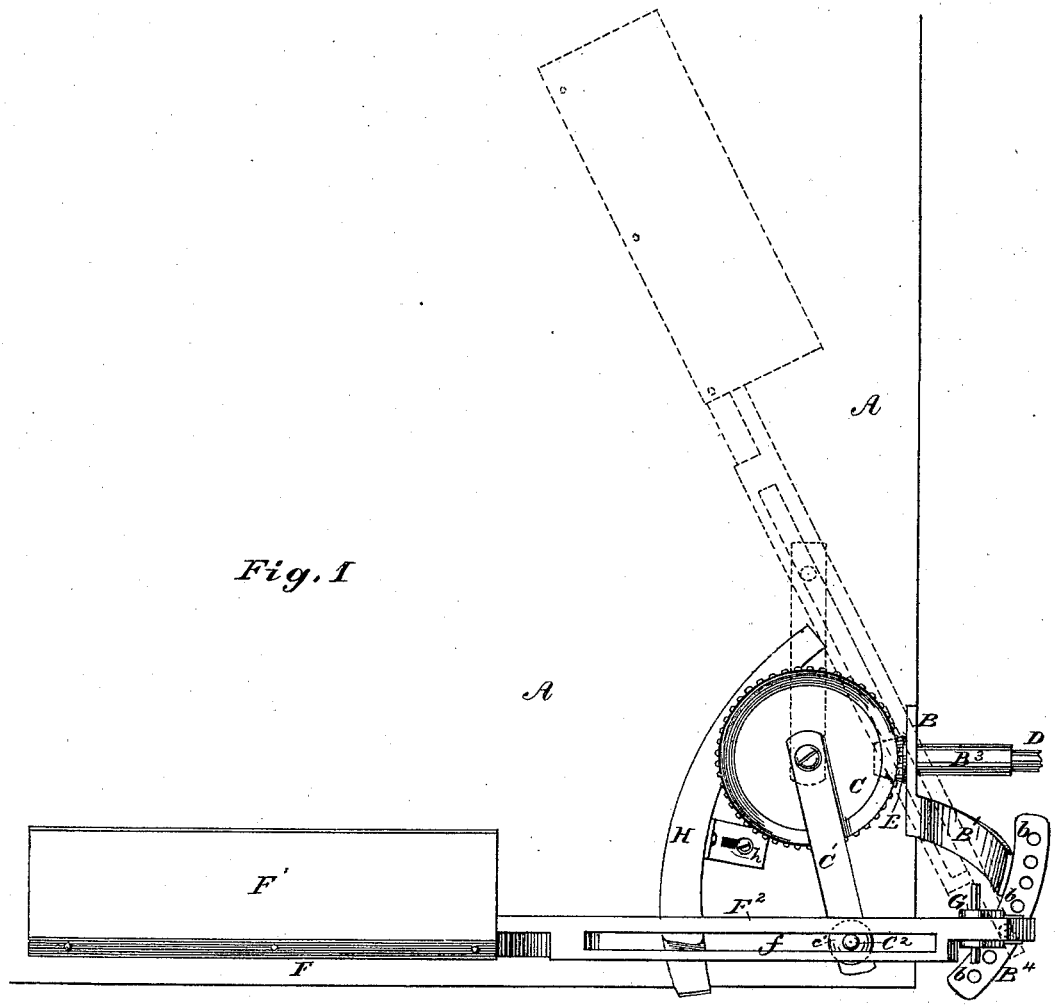

2 Sheets--Sheet 1.

J. COLLINS.
Harvester-Rakes.

No. 135,691. Patented Feb. 11, 1873.

Witnesses:-
Baltis De Long.
Joe S. Peyton.

James Collins,
by his Attys.
Burr & Rowe.

J. COLLINS

Harvester-Rakes.

No. 135,691.

2 Sheets--Sheet 2.

Patented Feb. 11, 1873.

Witnesses:—
Baltis De Long.
Jos. S. Peyton.

James Collins,
by his Attys,
Burr and Rowe.

UNITED STATES PATENT OFFICE.

JAMES COLLINS, OF GUELPH, CANADA.

IMPROVEMENT IN HARVESTER-RAKES.

Specification forming part of Letters Patent No. 135,691, dated February 11, 1873.

*To all whom it may concern:*

Be it known that I, JAMES COLLINS, of town of Guelph, Dominion of Canada, have invented certain new and useful Improvements in Harvester-Rakes, of which the following is a specification:

My invention relates to that class of rakes known as vibrating sweep-rakes. The object of the first part of my invention is to produce a simple, cheap, and efficient rake; to which ends the improvement consists in connecting the inner end of the rake-head with an inclined arm that extends upward and is pivoted at its end to a swivel secured to a bracket, and is operated by a continuously-revolving arm, provided with a vertical rod that passes through the slot in the rake-arm in such manner that the arm and rod will vibrate the rake backward over the platform to discharge the gavel, and then lift the rake above the platform as it moves forward to take the next gavel, as hereinafter described. The object of the next part of my invention is to provide means for adjusting the rake so that it can be lifted above the platform to any distance required when moving forward, so that it will not scatter the grain over which it moves; and the improvement consists in combining a rake-head, the slotted rake-arm swiveled to a bracket, a continuously-revolving rod that passes through the slot in the rake-arm to vibrate the rake, and a collar on the rod that may be adjusted to lift the rake-arm the required height, as hereinafter described. The object of the next part of my invention is to provide means for preventing the grain from being unevenly raked from the platform; and the improvement consists in providing a simple and effectual mechanism for adjusting the rake relatively to the finger-beam, so that when it drops upon the platform to remove the grain it can be arranged either parallel with the finger-beam or at an angle therewith, and compress the grain sufficiently to suit the condition of the crop, and thus permit it to be removed evenly from the platform, as hereinafter more fully described. The object of the next part of my invention is to provide a simple and effective means for keeping the rake down to its work, and at the same time permit it to pass freely over the platform when the within-described form of mechanism is employed; and the improvement consists in combining the bracket, the inclined rake-arm swiveled to and adjustable on the bracket, the rake-head provided with a friction-roller on its heel-end that supports the rake as it moves over the platform, and a guide-plate that keeps the rake down to its work when it meets with obstructions, and can be adjusted to accommodate itself to the adjustment of the rake-arm, as hereinafter more fully described.

Figure 2:
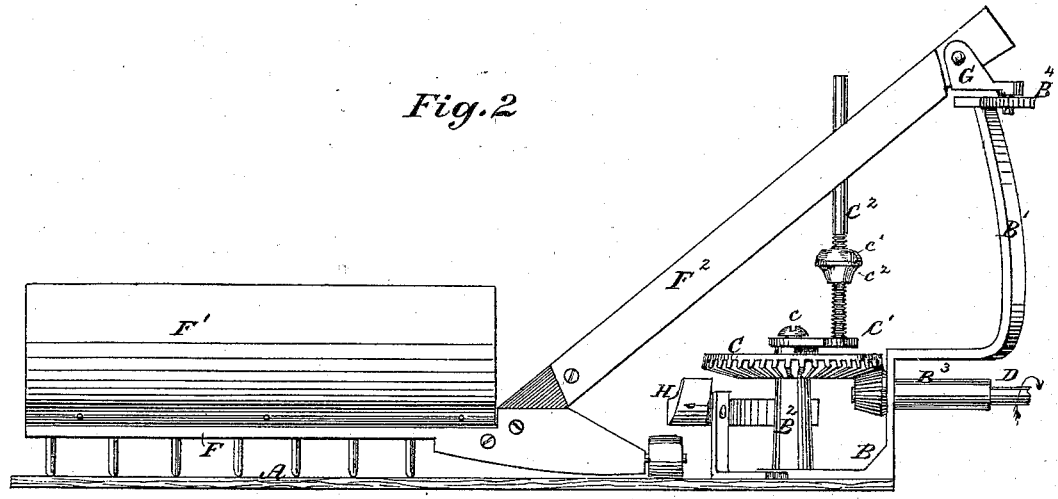

In the accompanying drawing, Figure 1 is a plan view of my improved device with the rake-head resting on the front part of the platform and about to move backward to remove the grain, and also representing the rake-head by dotted lines when it has been raised above the platform and is moving toward the front of the machine; Fig. 2, a front elevation of the same when the rake is in the position represented by full lines in Fig. 1; and Fig. 3, a side elevation, looking from the grain-side of the platform, when the rake is in position represented by the dotted lines in Fig. 1.

Figure 3:
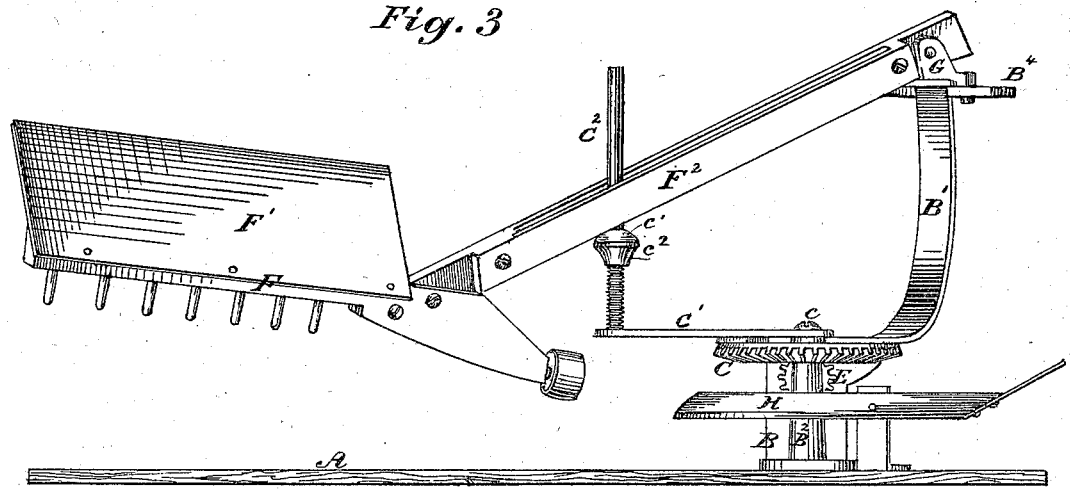

The platform A is, by preference, of the usual quadrant-shaped form. A cast-iron frame, B, is secured to the stubble-side of the platform at a suitable distance in rear of the cutting apparatus, and supports the gearing for operating the rake, and is provided with a bracke, $B^1$, to which the end of the rake-arm is swiveled. A pedestal, $B^2$, forms part of the frame, and supports the beveled wheel C, which revolves about a bolt, $c$, screwed into the top of the pedestal. A pipe-box, $B^3$, also forms part of the frame, and serves as a bearing for shaft D that is driven from the driving-axle of the machine in a suitable manner. The shaft D carries a beveled pinion, E, that meshes with the beveled wheel C, and imparts motion through it to the rake, as hereinafter described. The rake-head F is provided with a grain-plate, $F^1$, that supports the falling grain while the rake is at the front edge of the platform. A rake-arm, $F^2$, attached to the inner end of the rake-head, is pivoted to a swiveled hinge-piece, G, on the bracket $B^1$ of the frame, and is inclined sufficiently to clear the gearing that drives the rake. The beveled wheel C carries an arm, $C^1$, that revolves continuously with it, and has a vertical rod, $C^2$, secured to its end, that passes up through a vertical slot, $f$, in the rake-arm $F^2$, and vibrates the rake over the platform by the rotation of the vertical rod. In order that the rake may be lifted above the grain on the platform as it moves forward to rake a new gavel I place a collar, $c^1$, on the vertical rod; or, if desired, bend the arm $C^1$ at its end a suitable distance, so that as the arm or collar passes toward the grain side of the platform in its circuit it will bear against the under side of the rake-arm and lift it a suitable distance above the platform, as shown in Fig. 3 of the drawing.

In practice it is found desirable to vary the height that the rake is lifted above the platform as it moves forward, so as to be accommodated to the condition of the crop. This I accomplish by forming a screw-thread on the lower part of the vertical rod $C^2$, and placing a thumb-screw, $c^2$, below the collar $c^1$, that can be adjusted to raise the rake a sufficient distance to clear the grain as it passes forward above the platform. When the revolving arm is bent upward at its end to take the place of the collar the height that the rake is lifted may be adjusted by placing washers upon the vertical rod.

When the crop is heavy it is found best to let the rake-head drop upon the front edge of the platform in a line parallel to the finger-beam, so that the grain can be evenly removed to form a gavel; but when the crop is light it is best to let the rake-head drop upon the platform at an angle with the finger-beam, so that the inner end of the rake-head is first brought to bear upon the grain, and the grain compresed against the fence at the grain side of the platform so as to form a compact gavel, and prevent its being scattered. In order that the rake mechanism herein described may be adapted to meet these requirements I form a plate, $B^4$, at the top of the bracket $B^1$, to which the end of the rake-arm is swiveled, and provide it with a series of holes, $b\ b$, in such position relatively to the center of the beveled wheel C that the tangent formed by the rake-arm $F^2$ upon the circular path of the vertical rod and revolving arm may be changed by placing the swivel hinge-piece G in different holes of the bracket-plate.

In order that the rake-head may pass freely over the platform, and at the same time have sufficient weight to perform its work under ordinary circumstances, I place a friction-roller, $f$, upon the inner end of the rake-head that supports it, and also permits the rake to be more easily operated by the driving mechanism.

The rake sometimes meets with unusual obstructions as it passes over the platform, and the tendency then is to lift it up from its work and thereby cause it to operate imperfectly. This I prevent by securing a holding-down plate, H, to the platform, in position above the path of the roller, and so that it will not touch the roller when the rake-head is held down by its own weight to the platform, but will bear against and prevent the rake-head from being raised from its work by unusual obstructions. The holding-down plate may be made adjustable by a slot, $h$, in its bracket, or in any other well-known manner, to accommodate itself to the changing positions of the swiveled hinge-piece in the bracket and the corresponding change in the path moved by the roller on the rake-head.

I do not claim, broadly, a vibrating sweep-rake, operated by a continuously-revolving cam-wheel.

I claim as my invention, and desire to secure by Letters Patent—

1. The combination of the rake-head, the upwardly-inclined slotted rake-arm, the swivel-joint, the bracket, the continuously-revolving arm, and the vertical rod that passes through the slot in the rake-arm and serves to operate it, substantially as described.

2. The combination of the rake-head, the slotted rake-arm, the bracket, the revolving rod, and the adjustable collar on the rod for regulating the height that the rake-head is lifted above the platform, substantially as described.

3. The combination of the rake-head, the rake-arm, the hinge-plate, the bracket-plate provided with means for adjusting the hinge-plate and rake-arm relatively to the finger-beam, and the revolving crank-arm for operating the rake, all these parts being constructed and arranged substantially as described, for the purpose specified.

4. The combination of the bracket, the hinge-plate adjustable on the bracket, the inclined rake-arm pivoted to the hinge-plate, the rake-head, the friction-roller, and the adjustable guide-plate, all these parts being constructed and arranged for joint operation, substantially as described.

JAMES COLLINS.

Witnesses:
 JOHN CARROLL,
 WILLIAM DAVIS.